No. 843,415. PATENTED FEB. 5, 1907.
E. F. NORTHRUP.
ELECTRICAL SYNCHRONISM.
APPLICATION FILED OCT. 18, 1906.

Witnesses
John A. Murphy
Vernon E. Hick

Inventor
E. F. Northrup
by John H. Holk
his Attorney

UNITED STATES PATENT OFFICE.

EDWIN F. NORTHRUP, OF PHILADELPHIA, PENNSYLVANIA, ASSIGNOR TO LEEDS AND NORTHRUP COMPANY, OF PHILADELPHIA, PENNSYLVANIA, A CORPORATION OF PENNSYLVANIA.

ELECTRICAL SYNCHRONISM.

No. 843,415.      Specification of Letters Patent.      Patented Feb. 5, 1907.

Application filed October 18, 1906. Serial No. 339,469.

*To all whom it may concern:*

Be it known that I, EDWIN F. NORTHRUP, a citizen of the United States, residing at Philadelphia, in the county of Philadelphia and State of Pennsylvania, have invented certain new and useful Improvements in Electrical Synchronism, of which the following is a specification.

This invention relates to improvements in the synchronizing of dynamos, motors, rotary transformers, and the like, the said invention being characterized by its great simplicity, its applicability to machines of any size, and by the fact that the forces which produce the synchronism also tend to stop the hunting, thereby rendering the employment of any mechanical device for this purpose unnecessary.

In many systems hitherto used it has been necessary to employ some such arrangement as a hollow fly-wheel filled with heavy liquid or some other mechanical or electromechanical device for the purpose of damping out the variation of the moving body from a steady motion. With my invention no such extra means are necessary.

The invention is further characterized by the fact that the synchronizing force acts on the body to be synchronized whether the device is in synchronism or running at a speed above that of synchronism, so that is it not necessary for the device to first get out of synchronism before the synchronizing force begins to act. In other words, there is a force which acts constantly to preserve synchronism, a synchronizing impulse being given at every alternation of the alternating current or multiple thereof.

My said invention may be better understood by reference to the accompanying drawings, which form a part of this specification, and wherein—

Figure 1:
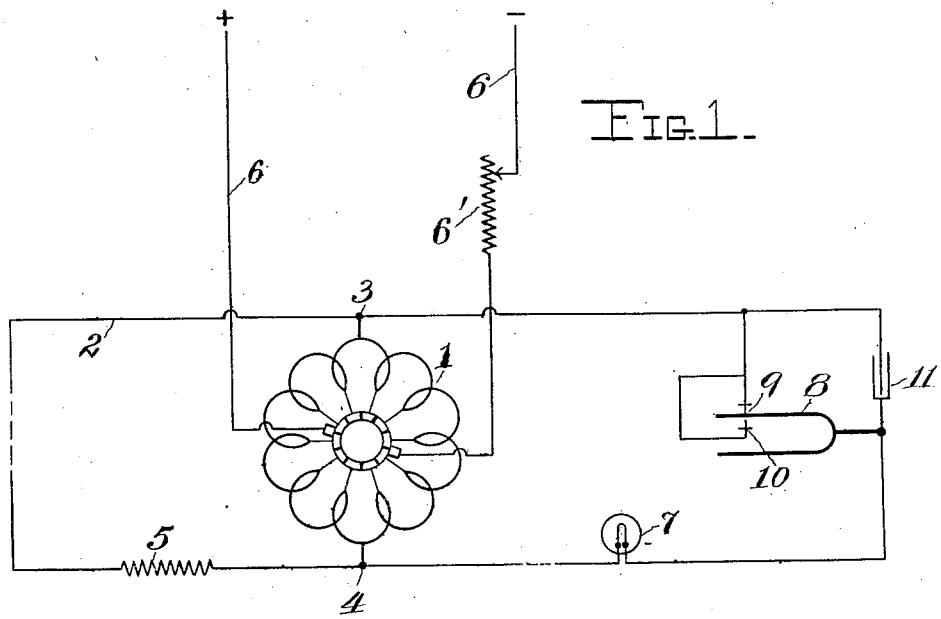
Figure 2:
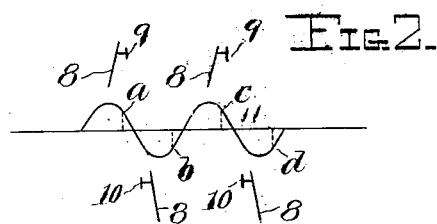

Figure 1 is a diagram representing one arrangement of apparatus embodying my invention; Fig. 2, a diagram to illustrate the principle thereof, and Fig. 3 a diagram representing a preferred arrangement of apparatus embodying my said invention.

I have herein shown my invention as applied in the case where it is desired that an alternator shall produce a current of unvarying frequency for certain purposes—as, for example, testing and calibrating electrical instruments and operating vibrating bodies that respond to definite frequency. The frequency being constant, the speed of rotation is also constant, adapting the apparatus to chronographs and the like, though I do not wish to be understood as limiting it to this or any other single application, for it may be applied also to synchronous telegraphs, and, in fact, to the production of synchronous motion for any use to which it may be applied.

In the arrangement shown in Fig. 1, 1 is a conventional representation of the armature-windings of a rotary converter; 2, the regular external alternating-current circuit leading from the alternating-current armature-terminals 3 4, and in this circuit may be any suitable load, (represented by the resistance 5.)

The rotary transformer in this case is operated as an inverted rotary and receives the direct current to drive it from the supply-mains 6 6. The speed of the rotating element of the machine 1 may be approximately adjusted by rheostat 6', connected in circuit with the driving element, or by other suitable means. Connected also to the alternating-current terminals 3 and 4 is a circuit which includes, essentially, an ohmic resistance and any suitable device for periodically making and breaking the circuit at regularly-recurring intervals, such intervals being preferably equal to or an even multiple of the alterations per second desired. This ohmic resistance is preferably one or more incandescent lamps—such, for example, as lamp 7 or other body or bodies, the resistance of which decreases as the current through it increases— while the contact-maker is preferably, especially in the application of the invention shown, an electrically-driven tuning-fork 8, one of the prongs of which vibrates between two contacts 9 and 10, though one of said contacts alone may be employed, the body of the tuning-fork being connected to one side of the circuit and the contacts 9 and 10 to the other. Any other device, however, which periodically makes and breaks the circuit may, if desired, be used.

In order to prevent sparking at the contacts 9 and 10, I may connect a small condenser 11 in shunt around the fork and contacts, as shown. This condenser does not exert any synchronizing effect, but is merely for the purpose stated.

The operation of the parts described is as follows: The tuning-fork is made to vibrate in any of the well-known ways or any other suitable manner at the desired frequency, and the rotary transformer or other machine is adjusted by varying the torque of the driving-motor to have a tendency to run at a speed to produce an alternating current of greater frequency than the frequency of the tuning-fork; but if the tuning-fork is vibrating it throws the load of the lamp 7 or other suitable resistance on the machine 1 each time the fork engages one of the contacts 9 10. If now the prongs of the tuning-fork engages contacts 9 or 10 at the instant that the alternating-current wave is passing through zero, Fig. 2, little or no current will flow through the lamp 7 and little or no load will be thrown on the machine 1. If by the next time that contact occurs at 9 or 10 the machine has increased in speed, so that the contact occurs when the wave has the value $a$, $b$, $c$, or $d$, a current will flow through lamp 7, which will be proportional to the instantaneous height of the wave at $a$ $b$, &c. The machine 1 will now receive a load each time contact occurs at 9 or 10, which will tend to stop a further increase of speed. If the motor element is adjusted to drive the generator element at a speed considerably in excess of synchronism, then the height of the wave at the instant of contact will be required to be still greater to produce the necessary retarding effect. In other words, the retarding effect or synchronizing-load will increase in proportion as the machine 1 tends to run above the speed of synchronism. When the driving force of said machine varies or the load thrown on the alternator is varied, the phase relation of the alternating wave and the making of contacts 9 10 varies in a similar manner. The synchronizing force thus automatically increases and diminishes to care for a tendency to a varying speed. The speed is thus held constant, and the apparatus holds in synchronism unless the variations of the driving force or the loads thrown on the machine 1 exceed the magnitude of the greatest possible synchronizing force. It is practical to arrange this synchronizing force so that the apparatus will hold in synchronism even when the driving forces vary as much as forty to fifty per cent.

An important feature of my invention is the employment of a resistance—such as the lamp 7, for example—which will decrease with increasing current through it, thereby greatly strengthening the synchronizing force. By using such a resistance the nearer the points $a\ b\ c$, &c., approach the crest of the waves, Fig. 2, at the instances of contact at 9 and 10 the greater is the power of the lamp 7 to receive current, or, in other words, the greater the phase displacement between the alternating current and the tuning-fork the stronger becomes the force to damp down this variation. The lamp 7 also serves the useful function of indicating by its brightness the phase alterations of the alternating current with respect to the periodic contacts when the driving force varies. When the driving force tends to run the machine 1 at exact synchronism, the contacts occur when the current is passing through zero and the lamp burns very dim. When the driving force increases, contacts occur when the waves approach a maximum and the lamp 7 burns brightly. Thus an inspection of the lamp tells how to adjust the rheostat in the direct-current circuit driving the apparatus. If the apparatus goes out of synchronism, the lamp varies in brightness in an irregular manner, and this plainly indicates that the synchronism is destroyed. With the driving force properly adjusted if the apparatus is forcibly thrown out of synchronism it will return to synchronism in from two to five seconds.

Figure 3:
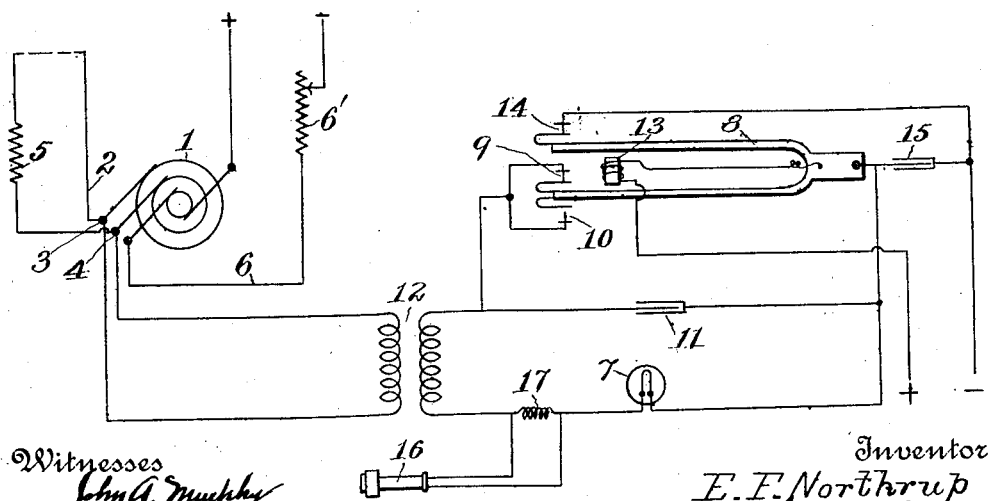

In Fig. 3 I have shown an arrangement of the apparatus in which the local synchronizing-circuit includes the lamp 7; but the tuning-fork is connected to the generator 1 through a static transformer 12. I have also shown in this figure means comprising an electromagnet 13 and make-and-break contact 14, connected in circuit therewith for operating the tuning-fork. The condenser 15 is for the purpose merely of preventing sparking at the contact 14 and is usually less than one-tenth M. F. A telephone 16, connected around a resistance 17 in the local synchronizing-circuit, may also be used to indicate the state of the synchronism.

When the apparatus is out of synchronism, the telephone emits sound-beats which lengthen as the apparatus gets more nearly into synchronism, and the sound becomes a steady hum when synchronism is attained.

Obviously in view of the indicating quality of the lamp 7 it is not essential to use this telephone; but in some cases it may be desired.

It will also be understood that the resistance forming the synchronizing-load may be varied to meet the demands imposed by variations in the size of the machines to be synchronized. For example, a single lamp, as herein illustrated, of from sixteen to thirty-two C. P. is sufficient for small rotary converters—say of one-eighth H. P. or thereabout; but when the invention is applied to larger machines several lamps may be required to produce the necessary load.

Having thus described my invention, what I claim is—

1. The combination with one or more coils arranged to develop a periodically-varying electric current, of a circuit including said coils and a synchronizing ohmic resistance, means to vary the load of said resistance on said coils at regular intervals the natural frequency of which is less than the natural frequency of the said electric current, the latter being damped down to synchronism with the period of said load-varying means by the load of said resistance.

2. The combination with one or more coils arranged to develop a periodically-varying electric current, of a circuit including said coils and a synchronizing ohmic resistance which decreases as the current through it increases, means to vary the load of said resistance on said coils at regular intervals the natural frequency of which is less than the natural frequency of the said electric current, the latter being damped down to synchronism with the period of said load-varying means by the load of said resistance.

3. The combination with one or more coils arranged to develop a periodically-varying electric current, of a circuit including said coils and a synchronizing ohmic resistance which decreases as the current through it increases, means to vary the load of said resistance on said coils at unvarying intervals, once for each electric impulse developed by said coils or multiple thereof, the natural frequency of which intervals is less than the natural frequency of the said electric current, the latter being damped down to synchronism with the period of said load-varying means by the load of said resistance.

4. The combination with a rotary alternating-current generator, of a circuit including the armature-coils of said generator and a synchronizing ohmic resistance which decreases as the current through it increases, means to vary the load of said resistance on said coils at unvarying intervals once for each alternating-current semicycle or multiple thereof developed by said generator the natural frequency of which intervals is less than the natural frequency of the said generator, the speed of the latter being damped down to synchronism with the period of said load-varying means by the load of said resistance.

5. The combination with one or more coils arranged to develop a periodically-varying electric current, of a circuit including a synchronizing ohmic resistance inductively connected to said coils, means to vary the load of said resistance on said coils at regular intervals the natural frequency of which is less than the natural frequency of the said electric current, the latter being damped down to synchronism with the period of said load-varying means by the load of said resistance.

6. The combination with a rotary alternating-current generator, and means to drive the same, of an external working circuit connected to the armature-terminals of said generator, a synchronizing-circuit connected to the same terminals of said generator with said working circuit and including a synchronizing resistance comprising an incandescent lamp to act as a load on said generator, a contact device comprising a tuning-fork arranged to make and break the electrical continuity of said circuit at unvarying intervals the natural period of which is greater than that of the current developed by said generator, the said load being thrown on said generator once for every semicycle or multiple thereof developed by said generator and acting to damp the speed of the generator down to synchronism with the periodicity of said tuning-fork.

7. The combination with a rotary alternating-current generator and means to drive the same, of an external working circuit connected to the armature-terminals thereof, a transformer having its primary connected to said armature-terminals, a synchronizing-circuit including the secondary of said transformer and a synchronizing resistance comprising one or more incandescent lamps to act as a load on said generator, a contact device comprising a tuning-fork arranged to make and break the electrical continuity of said circuit at unvarying intervals the natural period of which is greater than that of the current developed by said generator, the said load being thrown on said generator once for every semicycle or multiple thereof developed by said generator and acting to damp the speed of the generator down to synchronism with the periodicity of said tuning-fork.

In testimony whereof I affix my signature in presence of two witnesses.

EDWIN F. NORTHRUP.

Witnesses:
ERNEST RÜBEN,
GEORGE LACY.